Jan. 5, 1937.  B. KOZMER  2,067,154
APPARATUS FOR TREATING FOOTBALLS, BASKETBALLS, OR LIKE INFLATABLE BALLS
Original Filed July 2, 1934
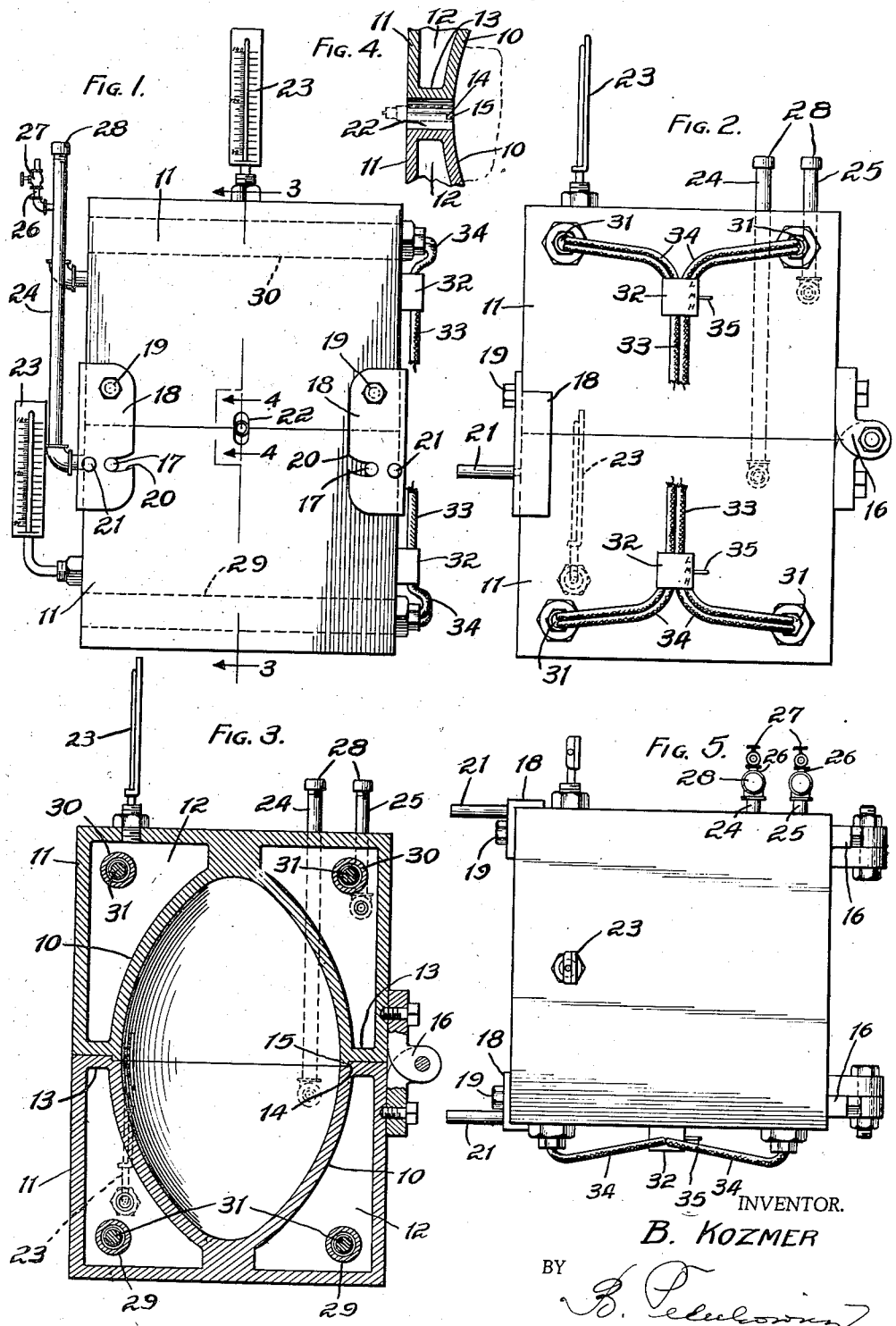
INVENTOR.
B. KOZMER
BY
ATTORNEY.

Patented Jan. 5, 1937

2,067,154

UNITED STATES PATENT OFFICE 2,067,154

APPARATUS FOR TREATING FOOTBALLS, BASKETBALLS, OR LIKE INFLATABLE BALLS

Benjamin Kozmer, Chicago, Ill.

Application July 2, 1934, Serial No. 733,413
Renewed April 29, 1935

3 Claims. (Cl. 69—1)

The present invention relates to apparatus for treating footballs, basket-balls or like inflatable balls and has for its object the provision of a pair of sections, each to include an inner shell or mold corresponding in shape to one-half of the ball to be treated, each of said shells or molds to be enclosed within a spaced casing, the space between the two to provide a heating chamber.

A further object of the present invention is the provision of heating means within the chambers of the two sections of the apparatus.

A still further object of the present invention is the provision of one or more tubes passing through each section within which heating elements may be inserted for the purpose of heating water within the heating chambers.

A still further object of the present invention is the provision of means for filling the heating chambers with water in association with safety valves through which the generated steam and water may be emitted.

A still further object of the present invention is to generally improve the device shown and disclosed in my patent, dated December 12, 1933, No. 1,938,913.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is the front elevational view of the device;

Fig. 2 is the side elevational view;

Fig. 3 is the vertical cross-sectional view on line 3—3 of Fig. 1;

Fig. 4 is a fragmentary cross-sectional view on line 4—4 of Fig. 1; and

Fig. 5 is a top plan view of the device.

Referring in detail to the present drawing there is shown therein a pair of semi-elliptical molds or shells 10 corresponding in shape to one-half of the ball to be treated. Each of said shells 10 is enclosed within housing 11 which is of box-like formation and spaced from said shell 10 to define a heating chamber 12. The edges of each of said shells 12 are connected with the adjacent opposite edge of housing 11 by means of connecting walls 13.

The mouth of the lower shell 10 is provided with semi-annular groove 14 and the corresponding portion of the upper shell is provided with an annular lug 15 fitting within said groove 14, by means of which arrangement the two shells 10 are interlocked when the two casings of the apparatus are in an operative closed position shown on Fig. 3.

Positioned at the rear walls of the two sections are a pair of hinges 16 by means of which the two sections of the device are connected and whereby the upper section may be pivoted with respect to the lower one.

A pair of stationary pin members 17 are secured to the front wall of lower sections 11 and a pair of latch members 18 are pivotally mounted upon suitable bolts 19 upon the front walls of the upper sections 11. Each of the latches 18 has an arcuate open-mouthed slot 20 which is adapted to receive the pin members 17 to securely lock upper and lower sections 11. Each of the latch members 18 is provided with an outwardly extending handle 21 whereby the latches may be easily grasped to be moved to an open or closed position.

In the operation of the present invention, a football is placed into the socket defined by shells 10 within the two sections 11 and the sections are locked together by means of latches 18 and pins 17. Means for allowing the valve of the football to protrude from the mold is had through the medium of elongated opening 22 which is formed partially in the two sections 11, including shells 10 and connecting walls 13, and through which opening the valve may outwardly extend. Thus when the football is placed within the device a pump may be connected to the valve and the air under high pressure may be pumped into the football bladder.

A pair of thermometers 23 is provided, one connected with each of the sections 11.

The above construction is substantially the same as disclosed in my said patent.

For the purpose of filling heating chambers 12 in each of sections 11 with water, a pipe 24 is connected with the lower section 11 while a similar pipe 25 is connected with the upper section of the device. Branching out laterally from the upper ends of each of said pipes 24 and 25 is a short pipe 26 having at its free upper end a safety valve 27.

Each of pipes 24 and 25 is threaded at the upper end thereof to receive thereon in threaded engagement caps 28. On removing said caps 28 water may be poured through pipes 24 and 25 into the respective upper and lower sections 11 until the two heating chambers 12 are completely filled with water. It is observed that the upper ends of pipes 24 and 25 extend above the upper wall of the upper section 11. When chambers 12 have been filled with water, caps 28 may be replaced upon pipes 24 and 25 and the water, when under expansion due to the influence of heat, or the generated steam within said chambers 12, may pass through the safety valves 27.

The lower section 11 is provided with a pair of tubes 29 connected in any suitable manner to the side wall of said section and passing through heating chamber 12 thereof. Similar tubes 30, similarly connected with the upper section 11 likewise pass through the upper chamber 12. Insertable within said tubes 29 and 30 are electric heating elements 31. Positioned upon the side walls of each section 11 is a switch box 32 to which electric city wires 33 are connected and from which the same branch out into the electric heating elements 31 as at 34. Each of the switches 32 has a manipulating lever 35 which may be manually shifted in order to connect or disconnect the electric current or whereby the extent of the current may be increased or decreased depending upon the desired temperature within the heating chambers 12. It is understood that the electric heating elements 31 are freely insertable within tubes 29 and 30 and may be replaced or withdrawn for the purpose of repairs. It is to be also understood that I do not desire to limit myself to the particular position or connection of pipes 24 and 25 or tubes 29 and 30 with their respective heating chambers 12.

While there is described herein a preferred embodiment of the present invention, it is nevertheless to be understood that minor changes may be made therein without departing from the spirit and scope of the invention as claimed.

What I claim as new is:

1. An apparatus for treating, forming or shaping a leather-covered inflatable ball, comprising a pair of complementary mold sections, each section including an inner wall corresponding in shape to one-half of the outline of the ball to be treated and an outer wall spaced from said inner wall and defining a heating chamber completely surrounding said inner wall, a tube rigidly connected with said outer wall of each section and passing through said heating chamber of the latter, and a heating element positioned within each tube.

2. An apparatus for treating, forming or shaping a leather-covered inflatable ball, comprising a pair of complementary mold sections, each section including an inner wall corresponding in shape to one-half of the outline of the ball to be treated and an outer wall spaced from said inner wall and defining a heating chamber completely surrounding said inner wall, a tube rigidly connected with said outer wall of each section and passing through said heating chamber of the latter, and electric heating elements positioned within each tube.

3. An apparatus for treating, forming or shaping a leather-covered inflatable ball, comprising a pair of complementary mold sections, each section including an inner wall corresponding in shape to one-half of the outline of the ball to be treated and an outer wall spaced from said inner wall and defining a heating chamber completely surrounding said inner wall, a tube rigidly connected with said outer wall of each section and passing through said heating chamber of the latter, means for filling said heating chamber with water, and a heating element positioned within each tube.

BENJAMIN KOZMER.